(12) United States Patent
Acton et al.

(10) Patent No.: US 9,311,583 B2
(45) Date of Patent: Apr. 12, 2016

(54) BARCODE COPY PROTECTION SYSTEM

(71) Applicant: Document Security Systems, Inc., Rochester, NY (US)

(72) Inventors: Nicole Acton, Churchville, NY (US); Michael Caton, Oakfield, NY (US); Patrick White, Mendon, NY (US); David Wicker, Dansville, NY (US)

(73) Assignee: Document Security Systems, Inc., Rochester, NY (US)

( * ) Notice: Subject to any disclaimer, the term of this patent is extended or adjusted under 35 U.S.C. 154(b) by 313 days.

(21) Appl. No.: 13/837,135

(22) Filed: Mar. 15, 2013

(65) Prior Publication Data
US 2013/0320099 A1    Dec. 5, 2013

Related U.S. Application Data

(60) Provisional application No. 61/654,082, filed on May 31, 2012.

(51) Int. Cl.
| | |
|---|---|
| *B41M 3/14* | (2006.01) |
| *G03G 21/04* | (2006.01) |
| *G06K 9/00* | (2006.01) |
| *G06K 19/06* | (2006.01) |
| *G06K 1/12* | (2006.01) |
| *H04N 1/00* | (2006.01) |
| *G06K 19/14* | (2006.01) |

(52) U.S. Cl.
CPC .......... *G06K 19/06056* (2013.01); *B41M 3/14* (2013.01); *B41M 3/146* (2013.01); *G03G 21/04* (2013.01); *G06K 1/121* (2013.01); *G06K 19/14* (2013.01); *H04N 1/00883* (2013.01); *G06K 2009/0059* (2013.01); *Y10S 283/902* (2013.01)

(58) Field of Classification Search
CPC ..... B41M 3/14; B41M 3/146; Y10S 283/902; H04N 1/00864; H04N 1/00872; H04N 1/00883; H04N 1/32144; H04N 1/00867; H04N 2201/3269; B42D 25/29; B42D 25/30; B42D 25/342; B42D 2035/08; B42D 2035/16; B42D 2035/34; B42D 2035/50; B42D 15/0013; B42D 15/002; G06K 19/06009; G06K 19/06018; G06K 19/06056; G06K 19/06065; G06K 19/06159; G06K 19/0628; G06K 19/14; G06K 7/12; G06K 7/14; G06K 7/1404; G06K 7/1408; G06K 7/1413; G06K 7/1417; G06K 2019/06253; G06K 2009/0059; G03G 21/04; G03G 21/043
USPC .......................................................... 283/902
See application file for complete search history.

(56) References Cited

U.S. PATENT DOCUMENTS

| | | | |
|---|---|---|---|
| 6,435,413 B1 * | 8/2002 | Kumagai et al. ......... 235/462.45 |
| 2005/0225080 A1 * | 10/2005 | Wicker ......................... 283/117 |
| 2007/0257977 A1 * | 11/2007 | Wicker et al. ................. 347/107 |
| 2012/0067960 A1 * | 3/2012 | Rowe ....................... 235/462.25 |

* cited by examiner

*Primary Examiner* — Michael G Lee
*Assistant Examiner* — Suezu Ellis
(74) *Attorney, Agent, or Firm* — McDonnell Boehnen Hulbert & Berghoff LLP

(57) ABSTRACT

A copy protection system for barcode includes a barcode pattern that is printed together with a security pattern that includes a line screen that intersects elements of the barcode pattern. A difference in print density between the barcode elements and the security pattern is sufficient to allow the barcode pattern to be read by a barcode scanner. However, upon reproduction of the printed barcode pattern and security pattern by a copier, the barcode pattern is not similarly readable on the resulting reproduction.

11 Claims, 6 Drawing Sheets

BARCODE COPY PROTECTION SYSTEM

CROSS-REFERENCE TO RELATED APPLICATIONS

This application claims priority to, and the benefit of, U.S. Provisional Patent Application No. 61/654,082, filed May 31, 2012, the content of which is hereby incorporated herein by reference in its entirety.

FIELD

The present disclosure relates to a copy protection system for barcodes, including barcodes that encode numeric or alphanumeric data in linear or matrix patterns. Matrix patterns include Quick Response (QR) Codes and other forms of two dimensional barcode.

BACKGROUND

Unless otherwise indicated herein, the materials described in this section are not prior art to the claims in this application and are not admitted to be prior art by inclusion in this section.

Elements of the barcode locally modify the reflectivity of surfaces on which the barcode is printed. Barcode scanners typically monitor relative intensities of light reflected from different areas of the printed surface, i.e., between areas of the printed surface that are printed with the elements of the barcode and adjoining areas of the printed surface in between the printed barcode elements, such that the patterns of relative intensities monitored by the barcode scanners can be interpreted for decoding the barcode. The barcode patterns can be printed as positive or negative images symbolic of numeric or alphanumeric data.

Typically, the barcode scanners emit beams of light from light sources, such as laser diodes, and measure the intensity of the reflected light, which is typically diffuse, with sensors, such as photo diodes. Optics can be used together with the sensors for capturing more of the reflected light. The light beams can be moved manually, such as in pen-type scanners, or automatically, such as in laser scanners. Variations in the reflectivity of the surfaces across the barcode patterns can be represented by voltage output patterns of the photodiodes, such as waveforms with peaks and valleys corresponding to the different amounts of light returned from the surface areas printed with barcode elements and the adjoining surface areas between the barcode elements. The waveforms can be decoded by pattern recognition software (processed within or in association with the scanner) for returning numeric or alphanumeric values.

SUMMARY

The present disclosure includes printing security patterns in a region containing a barcode either (i) between the printed elements of the barcodes, (ii) in the background of the printed elements of the barcodes, or (iii) as an overlay to the printed elements of the barcodes. The printed security patterns have a limited effect on the overall relative reflectivity between areas of surfaces that are printed with barcode elements and adjoining areas of the surfaces that are printed with the security patterns, such that the barcode scanners can still interpret the resulting patterns of relative intensities for decoding the barcodes on an original document or coupon. However, upon conventional copying, scanning, or other duplication of the printed barcode and security patterns on substitute surfaces by an imaging device, the relative reflectivity between the areas of the substitute surfaces on which the barcode elements are reproduced and the adjoining areas of the substitute surfaces on which the security patterns are reproduced is sufficiently reduced, distorted, or otherwise altered to preclude the barcode scanners from decoding the duplicate copies of the barcode. Thus, combining the printed security patterns with the barcode deters counterfeit copying, scanning, or other duplication of barcodes by imaging devices.

In some examples, the barcode security elements are printed at a reduced print density, e.g., 90 or less and more preferably between 55 percent and 85 percent with approximately 60 percent most preferred especially if printed in black ink. However, the print density is not limited to just the range 55-85. For example, a non-reduced print density of 100 is used in some embodiments. The security patterns are preferably printed at a further reduced print density (e.g., between 15 percent and 30 percent with approximately 20 percent most preferred), such that the difference in print density between the barcode elements and the security patterns remains high enough to maintain the differential reflectivity characteristics required for barcode scanners to distinguish the barcode elements from the adjoining security patterns on an original. The security patterns include printing in a relatively coarse line screen frequency (e.g., between 55 lines per inch and 95 lines per inch with approximately 75 lines per inch most preferred). While the overall print density of these line screens remains well below the print density of the barcode elements, the printed elements that form the line screens have a density more closely matching the density of the barcode elements. The spaces between the lines of the line screens lower the overall print density of the security pattern. The print elements of the line screens can themselves be formed as lines, dashes, dots, micro-print images, and other shapes. At a given line frequency and a given print density, the widths of the print elements can be increased to compensate for any breaks in the lines, e.g., the width of dashes alternating with spaces can be increased with respect to the widths of unbroken lines.

The line screens of the security patterns are preferably oriented out of alignment with edges of the barcode elements (e.g., orthogonally oriented) so that barcode scanners do not recognize lines of the line screens as a parts of the adjacent barcode elements. However, upon reproduction onto substitute surfaces by copying, scanning, or other reproduction, the lines of the line screen security patterns tend to fatten (i.e. enlarge) while the barcode elements of reduced print density tend to be reproduced as line screens themselves. Overall, the differences in reflectivity between the barcode elements and the security patterns, as monitored by a barcode scanner, tend to blur to the extent that the monitored intensity patterns are no longer reliably decodable. Preferably, the waveform through with the barcode scanner represents variations across the barcode pattern with an electronic signal is reduced in amplitude and incorporates additional noise both within the portions of the waveform that are representative of the barcode elements and the portions of the waveform that are representative of the security patterns between the barcode elements. For example, the waveforms may not be recognizable as corresponding to predefined waveforms, or thresholds distinguishing edges of the barcode elements may not reached.

The barcode elements can also be printed as line screens as a way of reducing print density. Preferably, any such line screens have a frequency and orientation (e.g., in the same direction as the individual bars) so as not to disrupt reading the originally printed barcode. However, the frequency and orientation of the barcode element line screens can be chosen to reduce the reflectivity contrast with the security pattern line screens in copies, scans, or other reproductions of the barcode or to increase noise in the corresponding waveform for disrupting the decoding of the barcode in unauthorized copies, scans, or reproductions.

While a single security pattern printed between adjacent barcode elements, in the background of the printed elements of the barcodes, or as an overlay to the printed elements of the barcodes, an original printed barcode can be used to deter unauthorized copying of the barcode by disrupting the reading of copies of the barcode, the security pattern is preferably incorporated into a printed background over which the entire barcode is printed. The background is preferably printed with a higher frequency line screen than the frequency of the security pattern and is preferably formed with voids (e.g. negative or white space between the various printed elements of the barcode) within which the security pattern is printed. The line screens of the security patterns and the backgrounds are preferably matched in apparent print density so that the security patterns are substantially hidden within the backgrounds. The security patterns within the backgrounds can be arranged to occupy only limited portions of the areas between the barcode elements but are preferably distributed among the areas so as to disrupt the effective copying, scanning, or other reproduction of the barcode through a full range of linear scan directions. Additionally, the security patterns may be a staggered patter so as to leave no portion of the underlying barcode unprotected.

The security patterns can also be shaped within correspondingly shaped voids or empty spaces in the background as either positive or negative images of words or symbols as a way of further authenticating the original printed barcode or invalidating reproductions. The background is also preferably printed as a line screen but at a different, preferably higher line frequency, and at a different angle. Despite these differences, the apparent print densities of the securing patterns and backgrounds preferably match to the naked eye so that the security pattern remains hidden within the background. A line screen overlay device matching a frequency or a multiple thereof of either the security pattern line frequency or the background line frequency can be used to render the words or patterns visible, for simple authentication. In one embodiment, the security pattern may take the form of a checker board pattern. A checkerboard pattern may avoid a false positive for original documents printed on a standard desktop printer.

Upon reproduction, the background line screen preferably fades or distorts while the security pattern becomes more pronounced (i.e. enlarged and/or darkened). The combination allows for the appearance of a security image in the reproductions to invalidate the copies. The security images, for example, can be words or symbols for visually tagging the reproductions as unauthorized copies. Generally, the security patterns, which are reproduced at a higher print density, form the security images, but the faded background could also be used form recognizable images against the higher density contrast of the reproduced security patterns. However, it is the reproduction and enlargement of the security patterns with the barcode that preferably disables the barcode in the reproductions.

Some embodiments of the present disclosure provide a copy protection system. The copy protection system can include a barcode pattern and a security pattern. The barcode pattern can include a plurality of barcode elements printed in a region on a printable surface. The security pattern can be printed in at least one area of the printable surface within the region. The barcode elements of the barcode pattern can be printed at a print density sufficiently greater than a print density of the security pattern such that: (i) the barcode pattern, as printed on the printable surface, is decodable by a barcode scanner, and (ii) a reproduction of the barcode pattern generated in accordance with an image of the printable surface is not similarly decodable by the barcode scanner.

Some embodiments of the present disclosure provide a copy protection system including a barcode pattern and a security pattern. The barcode pattern can include a plurality of barcode elements printed on a printable surface at a print density less than 90 percent. The security pattern can be printed on the printable surface at a print density between 10 percent and 30 percent. The security pattern is positioned to intersect an edge of at least one of the plurality of barcode elements through multiple linear scan directions at which the barcode pattern is configured to be scanned for reading.

Some embodiments of the present disclosure provide a method. The method can include printing, on a printable surface, a barcode pattern including a plurality of barcode elements at a print density less than 90 percent. The method can include printing a security pattern on the printable surface at a print density between 10 percent and 30 percent. Printing the security pattern can be carried out such that the security pattern is positioned to intersect an edge of at least one of the plurality of barcode elements through multiple linear scan directions at which the barcode pattern is configured to be scanned for reading.

These as well as other aspects, advantages, and alternatives, will become apparent to those of ordinary skill in the art by reading the following detailed description, with reference where appropriate to the accompanying drawings.

DETAILED DESCRIPTION

Figure 1:
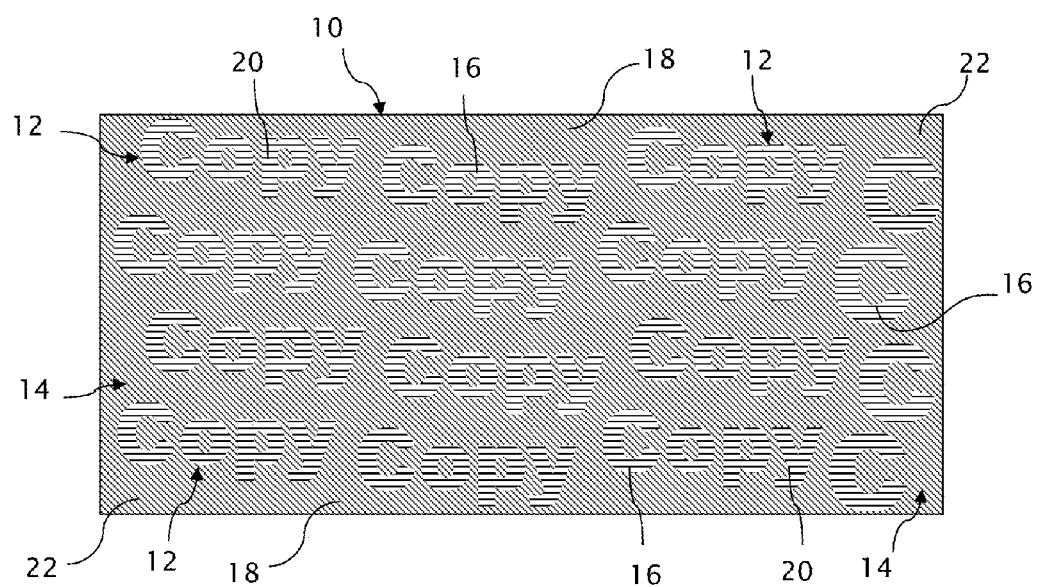
FIG. 1 depicts a document substrate portion on which a security pattern is printed on a substrate within similarly shaped voids in a background.
Figure 2:
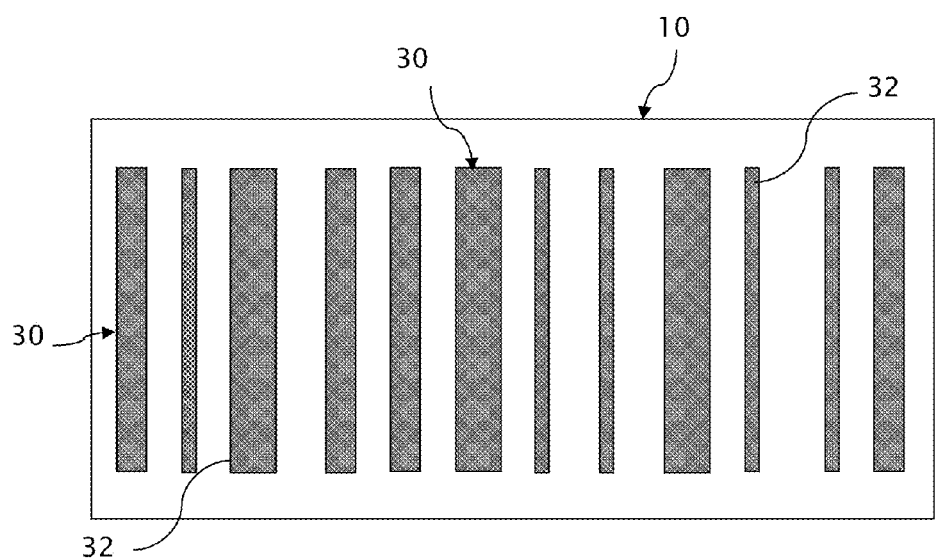
FIG. 2 depicts the document substrate portion printed with a barcode pattern having a limited print density.

As an illustration of one embodiment of the present disclosure, FIGS. 1 through 4 depict the printed components, assembly, and effective use of the invention. FIG. 1 shows a security pattern 12 printed together with a surrounding background 14 on a document substrate portion 10. The substrate portion 10 can be any printable substrate on which line screens can be printed. The printed document, of which the document substrate portion 10 is intended to be a part, can be any document to which a barcode is intended to be applied. For purposes of reference, the vertical and horizontal directions of the drawing sheets 1 and 2 containing FIGS. 1 through 4 are regarded as the vertical and horizontal directions of the document substrate portion 10 as well as the corresponding document from which the substrate portion 10 is drawn.

Both the security pattern 12 and the background 14 are printed as line screens 16 and 18 with the line screen 16 of the security pattern 12 printed within voids in the background line screen 18 or visa versa. The security pattern 12 is depicted in a pattern that repeats the word "COPY" throughout the substrate portion 10 but could be in the form of an image or other symbol, as well as any other pattern that fits together with the background 14.

The line screen 16 of the security pattern 12 contains line segments 20 that are substantially horizontally oriented. The line screen 18 of the background 14 contains line segments oriented at an acute angle (e.g., 45 degrees) to the vertical and horizontal directions. In addition, the line screen 18 of the background 14 has a line frequency greater than a line frequency of the line screen 16 of the security pattern 12. Preferably, the line screen 16 of the security pattern 12 is printed at a relatively coarse line frequency, e.g., between 55 lines per inch and 95 lines per inch with approximately 75 lines per inch most preferred. The line screen 18 of the background 14 is preferably printed at a finer line frequency, e.g., over 150 lines per inch with 180 lines per inch most preferred.

The print elements of the line screens 16 and 18 of the security pattern 12 and the background 14 are depicted as line segments 20 and 22, interrupted only by the dimensions of the given document substrate portion 10 or the boundaries between the security pattern 12 and the background 14. However, the print elements can take other forms such as dots or dashes, as well as curvilinear shapes.

Despite their differences, the security pattern 12 and background 14 are preferably printed at visually matching print densities so that the security pattern 12 and the background 14 are not readily visually distinguishable to the naked eye. Print density, as used herein, is regarded as a measure of color saturation. For example, if both line screens 16 and 18 are printed with black ink against a white background of the substrate portion 10, the print density of each of the line screens 16 and 18 is measured as a percentage of the white background that is covered by the black ink. If gray ink is used instead of black ink, the percentage of white ink within the gray ink correspondingly reduces the percent coverage of the ink. Although the print densities of the security pattern 12 and background 14 substantially match, some adjustments can be made for visually deceptive effects, such as the different line frequencies, so that the security pattern 12 and background 14 appear as the same shade of color, e.g., gray.

In some embodiments, the security pattern 12 and/or the background 14 are printed with at least a portion in a non-black color. For example, the security pattern can be printed with some red or green elements. The security pattern may be printed at a density between about 40% and about 90%, for example. An imaging device, such as a charge-coupled device (CCD) may include a complementary metal-oxide-semiconductor (CMOS) sensor and/or another array of photo-sensitive sensors. The CMOS sensor of the CCD may interpret the red or green elements of the security pattern 12 and/or the background 14 as the color black. For instance, the CMOS, CCD, and/or associated image processing hardware/software may be configured such that the security pattern rendered in red and/or green colors is processed such that the red and/or green elements forming the security pattern are indistinguishable from black elements forming the security pattern. For example, the CMOS, CCD, and/or associated image processing hardware/software may be part of a monochromatic imaging system (e.g., black and white), or an imaging system which produces results substantially similar to a monochromatic imaging system. Thus, the image captured by the CCD may capture visually deceptive effects and interference in the same color as the barcode elements (e.g., black). Therefore, the device with the CCD (or printouts made from CCD-captured images), may not render a correct barcode (e.g., a barcode which is then subsequently able to interpreted by a barcode reader). Some embodiments of the present disclosure In FIG. 2, an exemplary barcode pattern 30 is shown separately printed in a barcode region on the document substrate portion 10. In accordance with conventional practices, the barcode pattern 30 is composed of elements 32 in the form of vertical bars of different widths. As used herein, the barcode elements 32 collectively occupy a barcode region of the document substrate portion 10, which barcode region may include areas interposed between the barcode elements 32, areas near (but not between) the barcode elements 32, and/or the areas of the barcode elements 32 themselves. The barcode elements 32 are printed at a reduced print density, e.g., 90 percent or less and more preferably between 55 percent and 85 percent with approximately 60 percent most preferred. The reduced print density can be achieved by incorporating a percentage of white ink, such as a mixture of black and white ink resulting in gray bars, or as a line screen pattern that incorporates white from the document substrate portion 10 also resulting in gray bars. Print elements of the line screen patterns can be printed stochastically or, for example as vertically oriented line segments. Preferably, edges of the barcode elements 32 remain relatively distinct regardless of the way in which the barcode elements 32 are printed.

Figure 3:
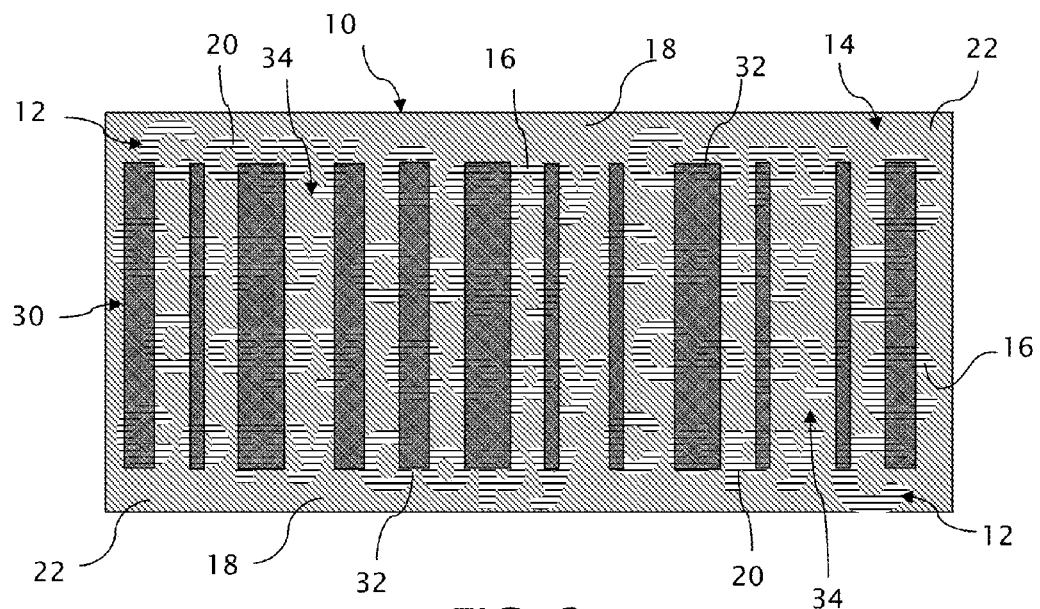
FIG. 3 depicts the document substrate portion in which the barcode pattern shown in FIG. 2 is printed over the security pattern and background shown in FIG. 1.

FIG. 3 shows the barcode pattern 30 printed over the security pattern 12 and the background 14. In relation to the barcode pattern 30, the security pattern 12 and background 14 are preferably printed at a reduced print density (e.g., between 15 percent and 30 percent with approximately 20 percent most preferred), such that the difference in print density between the barcode elements 32 of the barcode pattern 30 and the security pattern 12 and background 14 remains high enough to maintain differential reflectivity characteristics required for barcode scanners to distinguish barcode elements 32 from the security pattern 12 and background 14.

That is, although contrast between the barcode elements 32 and their adjacent spaces 34 is reduced first by a reduced print density of the barcode elements 32 and second by the presence of the security pattern 12 and background 14, the contrast remains high enough for conventional barcode scanners to read the barcode pattern 30. The conventional barcode scanners can take a variety of forms including handheld e.g., pen or wand-type, scanners or fixed-mount scanners in which the barcode pattern 30 is swept past a scanner beam or a scanner beam is swept past the barcode pattern 30.

Preferably, the printed barcode elements 32 overlay portions of the printed security pattern 12 and background 14. However, the printed security pattern 12 and background 14 could overlay the barcode elements 32, or the barcode elements 32 could be printed within correspondingly shaped voids in the printed security pattern 12 and background 14.

In some embodiments, the elements of FIG. 3 may not be printed at all, but rather displayed via a mobile device or other computing device with associated electronically controlled display. Some mobile devices may display images (e.g., QR codes and the like) to be scanned by a reader and/or imager. For example, a computing device may be used to display a two-dimensional pattern (e.g., a QR code or other scannable image) via an electronically controlled display employing an array of transmissive, emissive, and/or reflective pixel elements to render a desired pattern in accordance with display instructions. The rendered pattern can then be detected by a reader by, for example, imaging and/or scanning with a barcode reader (e.g., by detecting reflected infrared radiation), and the detected pattern can be identified and/or characterized by a processing system associated with the reader. For example, the detected pattern may be processed by pattern recognition to associate the detected pattern with a pre-determined value, outcome, etc., such as a value stored in a lookup table, which pre-determined value may then be reported back as appropriate, similar to the discussions herein of using printed barcodes for authentication, for recognition of pre-determined information in a database, etc.

Thus, the methods and/or systems disclosed herein may also function with respect to barcodes and security elements rendered on an electronically controlled display. In some embodiment, the security elements may not form a static display on the mobile device screen. The security elements may flash, blink, or otherwise dynamically change as the barcode is displayed to modify the resulting image, as perceived by an imager integrating collected light over a pre-determined image capture duration. That is, in some embodiments, the finite pixel density of an electronic display may be effectively increased, as perceived by a reader, by selectively displaying on particular pixels in the display such that the resulting image, as integrated by an imager in a time-averaged way, has a relatively greater spatial resolution than achievable by the pixel density of the electronic display. Thus, security patterns similar to those described herein in the context of printed security patterns may be rendered on an electronic display by displaying a security pattern in the background of a scannable pattern. In some examples, the security pattern rendered by such an electronic display may include dynamic content rendered by selectively turning on and off particular pixels in such a display on a timescale sufficient to be integrated by a reading device, such as an imager with a photo-sensitive portion that integrates collected light during an image capture duration.

For example, a mobile phone may display a barcode for use with a payment system. A security pattern displayed in conjunction with the barcode may change while the barcode is being displayed. The security pattern may change in color and/or shape, for example. The security pattern can be configured to allow the barcode to be read by a barcode scanner (e.g., via reflected infrared radiation or other techniques). However, the time-changing security pattern can prevent a second device from effectively capturing the image by, for example, imaging the display screen. Due to the time-changing security pattern, such a captured image may include interfering patterns/features in the background of the barcode (e.g., the region near the barcode). Thus, when the captured image is subsequently displayed via an electronic display, the displayed image is unable to be successfully scanned (e.g., authenticated) by the barcode scanner. The dynamically displayed security pattern can thereby prevent an imaging device from capturing electronically displayed barcodes and then displaying in a manner that is recognized by a barcode reader. The security patterns thereby prevent the originally displayed barcode from being spoofed. As previously discussed, the security elements may include a colored element that a CCD (i.e., a mobile phone camera) may interpret as black. Thus, a mobile device taking a picture of a barcode may have interference, distortion, or other errors in the captured picture. These errors may then make the captured barcode unusable.

Figure 4:
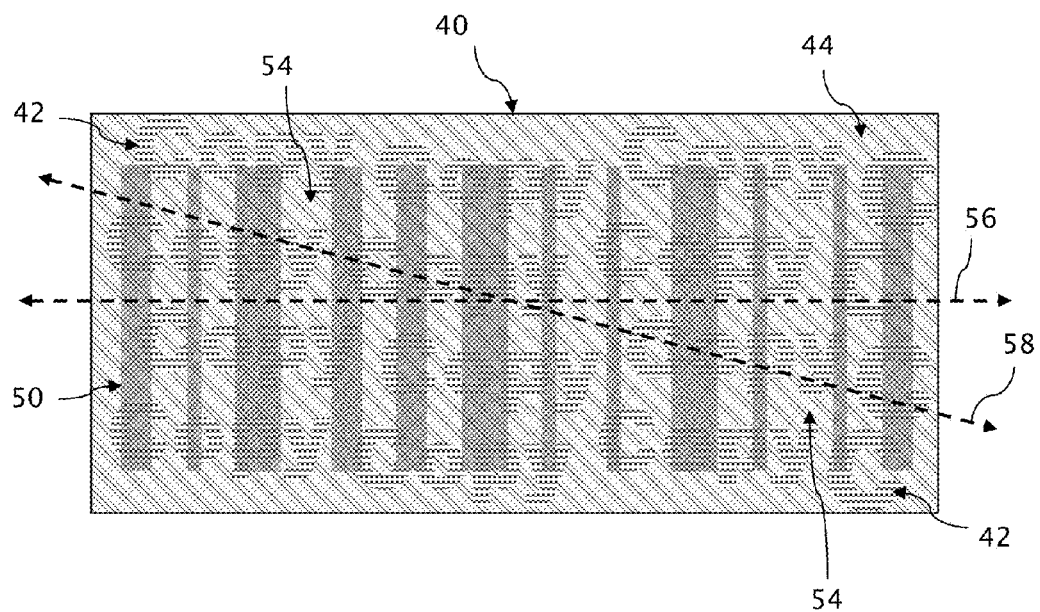
FIG. 4 depicts a substitute document substrate portion as a reproduction of the printed document substrate portion shown in FIG. 3 by a conventional copier.

FIG. 4 depicts a substitute substrate portion 40 on which the security pattern 12, the background 14, and the barcode pattern 30 are reproduced by a conventional copier as reimaged security pattern 42, reimaged background 44, and reimaged barcode pattern 50. In contrast to the barcode pattern 30 on the document substrate portion 10 (as an original document), the reimaged barcode pattern 50 overlying the security pattern 42 and background 44 on the substitute substrate portion 40 (as a copied document), is not similarly readable by a conventional barcode scanner.

Conventional copiers are one type of imaging device intended for use with embodiments of the present disclosure. Such copiers may include traditional photocopiers with electrostatically charged drums or belts as well as digital copy scanners in which images are scanned and separately printed. In either case, reflectivity differences across a printed document are reproduced as corresponding images. For purposes of copying the printed barcode 30, the conventional copiers are assumed to be operated as intended with settings consistent with manufacturer recommendations. As such, the failure to reproduce the barcode pattern 30 in a form readable by a conventional copier is not the fault of the copier, which is assumed to be operating properly, but of the security pattern 12, which is reproduced together with the barcode pattern 30.

In general, the security pattern 12, which is printed as a coarse line frequency, reproduces as the reimaged security pattern 42 at a higher print density than the background, which is printed at a finer line frequency and reproduces as the reimaged background 44 at a lower print density. Similarly, the barcode pattern 30 preferably reproduces as the reimaged barcode pattern 50 at a lower print density. Thus, the contrast between the reimaged barcode pattern 50 and the reimaged security pattern 42 is reduced by both the relative increase in the print density of the reimaged security pattern 42 and the relative decrease in the print density of the reimaged barcode pattern 50. The reduced contrast prevents the successful reading of the reimaged barcode pattern 50 by a conventional scanner. Either the relative increase in the print density of the security pattern 42 or the relative decrease in the print density of the reimaged barcode pattern 50 alone may sufficiently reduce contrast between the reimaged barcode pattern 50 and the reimaged security pattern 42 to preclude the successful reading of the reimaged barcode pattern 50 by a conventional scanner.

In addition to disabling the reimaged barcode 50, the reimaged security pattern 42, in contrast to the reimaged background 44, provides a visual indication that the reimaged barcode 50 is not authorized or not intended for further use. As shown in FIG. 4, the term "COPY", which is formed by the reimaged security pattern 42, becomes clearly visible upon reproduction and is repeated through the reimaged barcode pattern 50.

Although the reimaged security pattern 42 does not entirely fill spaces 54 between reimaged barcode elements 52, the spaces 54 are sufficiently filled so that at least one of the reimaged barcode elements 52 remains unreadable in any linear scan direction, e.g., 56 or 58, at which the reimaged barcode elements 52 might be scanned. The reimaged security pattern 42 is particularly effective for locally reducing edge contrast and shape (i.e. straight lines or edges may be blurred) of the reimaged barcode elements 52. For this purpose, the line screen 16 of the security pattern 12 preferably intersects the barcode elements 32. However, to preserve the original integrity of the edges of the barcode elements 32, the line screen 16 is preferably oriented for intersecting the barcode elements 32 at a near normal angle, although lesser angles could also work. Generally, angles of at least 45 degrees are preferred so that the edges of the barcode elements 32 remain sufficiently distinguishable to a scanner.

Arranging the security pattern 12 to interrupt the entire edge of a single barcode element 32 may be sufficient to preclude the conventional reading of the reimaged barcode pattern 50. However, distributing the security pattern 12 over a larger portion of the barcode pattern 30 allows greater flexibility for forming words or symbols and allows the security pattern 12 to be better hidden within a background 14.

Figure 5:
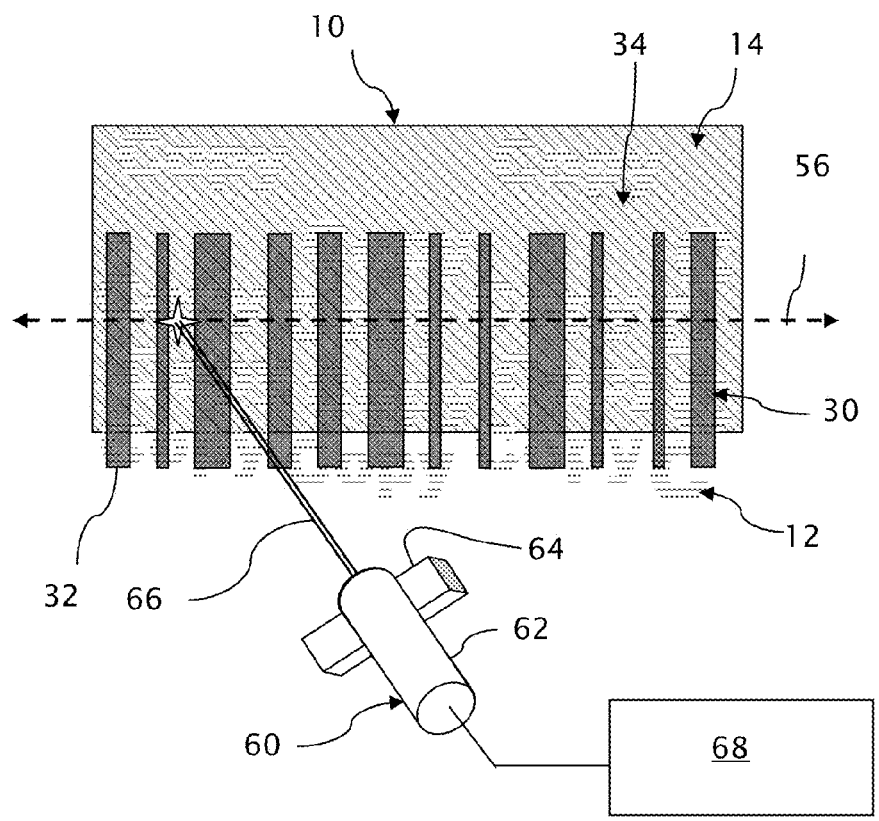
FIG. 5 depicts a barcode scanner for reading the barcode pattern as printed on the document substrate portion of FIG. 3.

FIG. 5 depicts the operation of a conventional scanner 60 for scanning the barcode pattern 30 printed on the document substrate portion 10. The scanner 60 includes a light source 62 (such as a laser) for emitting a narrow beam light 64 and light sensor 66 (such as a photodiode) for sensing diffuse reflections from the substrate portion 10. In addition, the scanner 60 includes decoder circuitry 68 that monitors waveforms produced by the light sensor 66 in response to intensity variations of the reflected light and identifies patterns associated with valid barcode sequences. Output from the decoder circuitry provides interpretations of the barcode sequences. Although the same conventional scanner 60 can be used for scanning the reimaged barcode pattern 50 on the substitute substrate portion 40, the waveform output from the light sensor 66 is not similarly associable with a valid barcode sequence.

Differences in reflectivity between the reimaged barcode elements 52 and the reimaged security patterns 42, as monitored by the barcode scanner 60 blur to such extent that the monitored intensity patterns are no longer decodable. Preferably, the waveform through with the barcode scanner 60 represents variations across the reimaged barcode pattern 50 with an electronic signal is preferably reduced in amplitude and incorporates additional noise both within the portions of the waveform that are representative of the reimaged barcode elements 52 and the portions of the waveform that are representative of the reimaged security patterns 42 between the reimaged barcode elements 52. For example, the waveforms may not be recognizable as corresponding to predefined waveforms, or thresholds distinguishing edges of the reimaged barcode elements 52 may not reached.

Figure 6:
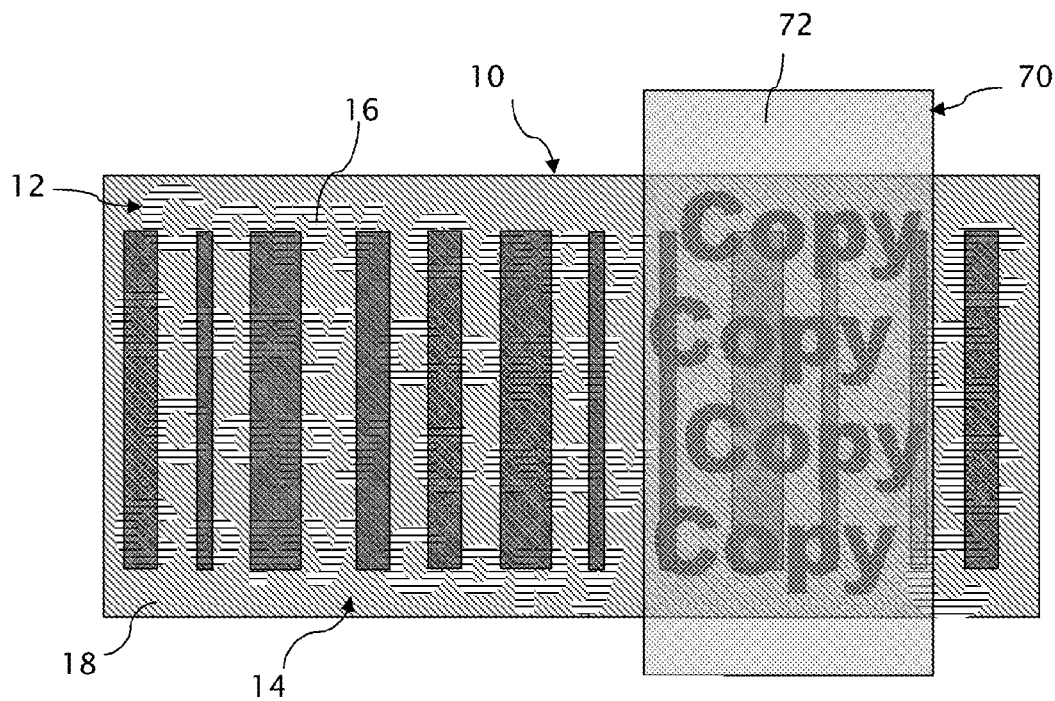
FIG. 6 depicts a decoder viewer overlaid on a portion of the printed document substrate portion of FIG. 3.

A decoding viewer 70 is shown in FIG. 6 overlaying the original printed substrate portion 10 for revealing a security image formed between the security pattern 12 and background 14. The decoding viewer 70 includes a line screen 72 having a line frequency at an integer multiple of the line frequency of the line screen 16 of the security pattern 12. When overlaid and angularly aligned as shown, the line screen 72 of the decoding viewer 70 increases the contrast between the security pattern 12 and the background 14 for rendering the repeating pattern of the word "COPY" visible. A comparable effect can be achieved by matching the line screen 72 to the background line screen 18 (i.e., matching in orientation and as an integer multiple of background line frequency) to increase contrast for rendering the word "COPY" visible as a negative image.

Figure 7:
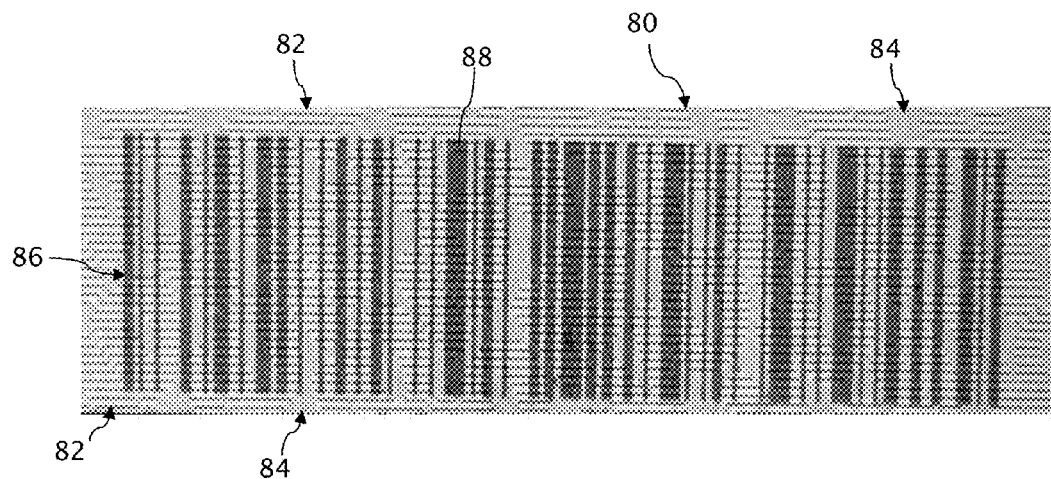
FIG. 7 presents an image of a document substrate portion on which a barcode pattern is printed over a security pattern and background.

FIG. 7 depicts another example of a document substrate portion 80 on which a security pattern 82 and a background 84 underlie a barcode pattern 86. The security pattern 82 and the background 84 preferably match in apparent print density, e.g., as the same shade of gray. Although barcode elements 88 of the barcode pattern 86 are printed at a higher print density than the print densities of the security pattern 82 and the background 84 so that the barcode pattern 86 is interpretable by a conventional barcode scanner, the print density of the barcode elements 88 is preferably limited so that upon reproduction by a conventional copier, the contrast between the barcode elements 88 and the security pattern 82 is sufficiently reduced so that the barcode pattern 86 is no longer similarly interpretable.

Figure 8:
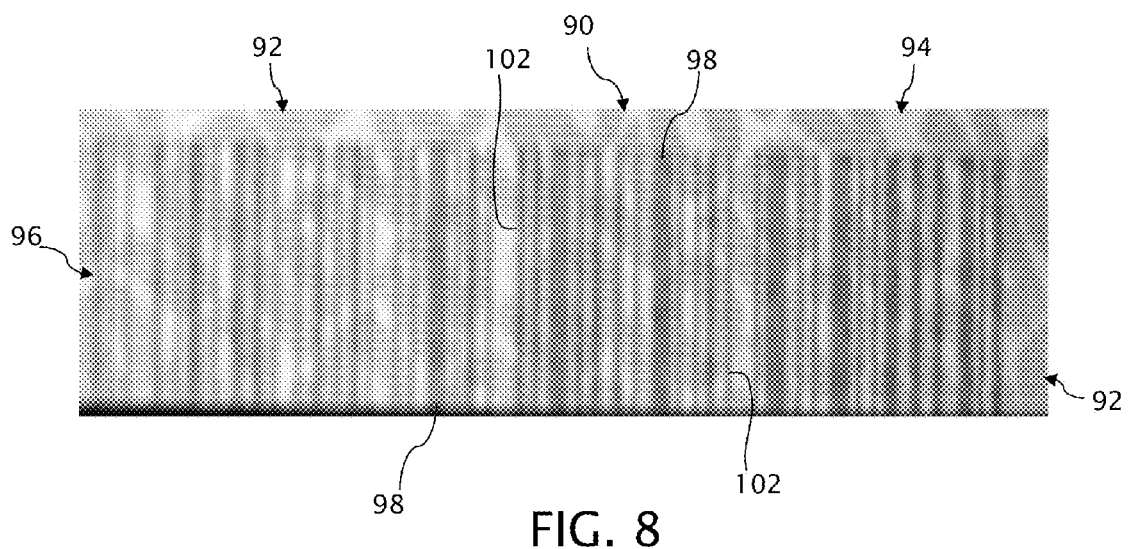
FIG. 8 presents an image of a substitute document substrate portion as a reproduction of the printed document substrate portion shown in FIG. 7 by a conventional copier.

The reduced contrast upon such reproduction is shown in the view of FIG. 8. The security pattern 82 is reproduced on a substitute document substrate portion 90 as a reimaged security pattern 92 at a relatively higher print density and both the background 84 and the barcode elements 88 are reproduced on the substitute document portion 90 as a reimaged background 94 and reimaged barcode elements 98 at a relatively lower print density. The reduced contrast between the reimaged barcode elements 98 and the reimaged security pattern 82 blurs edges 102 of the reimaged barcode elements 98 and thereby prevents successful interpretation of the reimaged barcode pattern 96 on the substitute substrate portion 90. An increased contrast between the reimaged security pattern 92 and the reimaged background 94 reveals the patterns with which both the security pattern 82 and the background 84 were originally printed. The two patterns, which are complementary images, can be recognized as a further visual indication that an unauthorized copy has been made.

Figure 9:
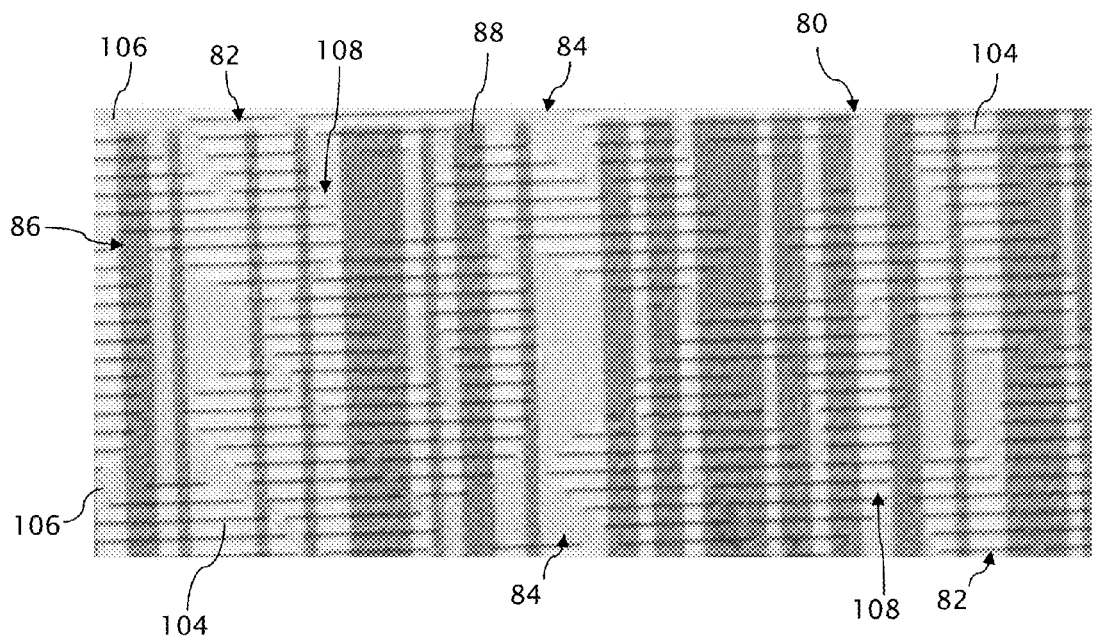
FIG. 9 presents an image of an enlarged portion of the printed document substrate portion of FIG. 7.

FIG. 9 is an enlarged view of a portion of the document substrate portion 80 of FIG. 7. In the enlarged view, the reduced print density of the barcode elements 88 allows for overlapped portions of the security pattern 82 and background 84 to be at least partly visible. For example, if the barcode elements 88 are stochastically printed in black ink at a print density of 60 percent, and the security pattern 82 is printed with line print elements (i.e., line segments) 104 in black ink at a print density of 20 percent, the print elements 104 are visible within the barcode elements 88 at a contrast of 40 percent, i.e., the difference between the 100 percent print density of the print elements 104 themselves and the 60 percent print density of the barcode elements 88, which cover the otherwise white space between the print elements 104. Within the area of the barcode elements 88 overlapped by the security pattern 82, 20 percent of this area is covered at a print density of 100 percent (there being no higher print density) and the remaining 80 percent of the area is covered at a print density of 60 percent, yielding an average print density of 68 percent. A similar calculation can be made for print elements 106 of the background with an equal average print density for the barcode elements 88 of 68 percent. Spaces 108 between the barcode elements 88 continue to exhibit an 20 percent print density, so the overall contrast between the barcode elements 88 and their intervening spaces 108 is 48 percent, which is higher than a 40 percent difference if the print elements 104 and 106 of the security pattern 82 and background 84 did not overlap with the barcode elements 88.

Figure 10:
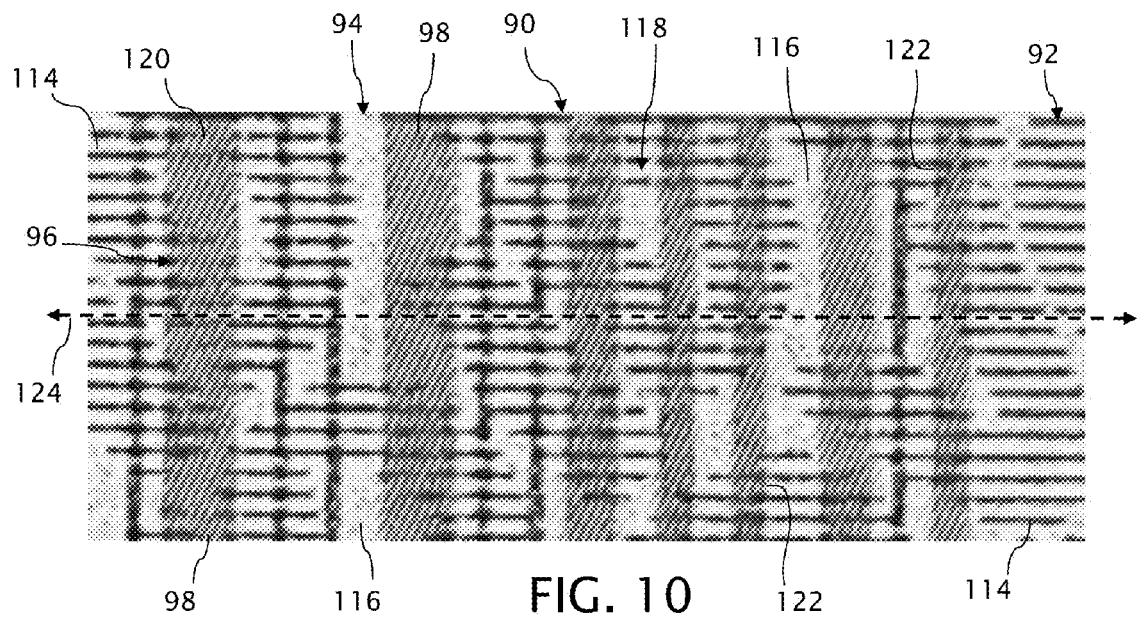
FIG. 10 presents an image of an enlarged portion of the substitute document substrate portion of FIG. 8 as reproduced by the conventional copier.

A similar level of contrast (e.g., 40 percent) remains within the barcode elements 88 between the print elements 104 and 106 of the security pattern 82 and background 84 and the barcode elements 88. Upon reproduction, as shown in an enlarged view FIG. 10, variations in print density also occur along the height of the reimaged barcode elements 98. Reimaged higher frequency print elements 116 of the reimaged background 94 tend to fade, whether beneath the reimaged barcode elements 98 or within intervening spaces 118, and reimaged lower frequency print elements 114 of the reimaged security pattern 92 tend to fatten or enlarge, whether beneath the reimaged barcode elements 98 or within the intervening spaces 118. Thus, just by the different reimaging qualities of the reimaged securing pattern 92 and reimaged background 94, the reimaged barcode elements 98 can be made to vary in print density along their height or other dimension (e.g., width) and even among the reimaged barcode elements 98 themselves. Combined with the reimaged security pattern 92 at a relatively higher print density and the reimaged barcode elements 98 themselves at a relatively lower print density and in the form of a line screen 120 (shown oriented to approximately 45 degrees), edges 122 of the reimaged barcode elements 98 are rendered much less distinct. As a scanning beam 124 crosses the reimaged barcode elements 98, waveforms registering reflective intensity variations are no longer recognizable as waveforms associated with conventional barcode patterns.

Figure 11:
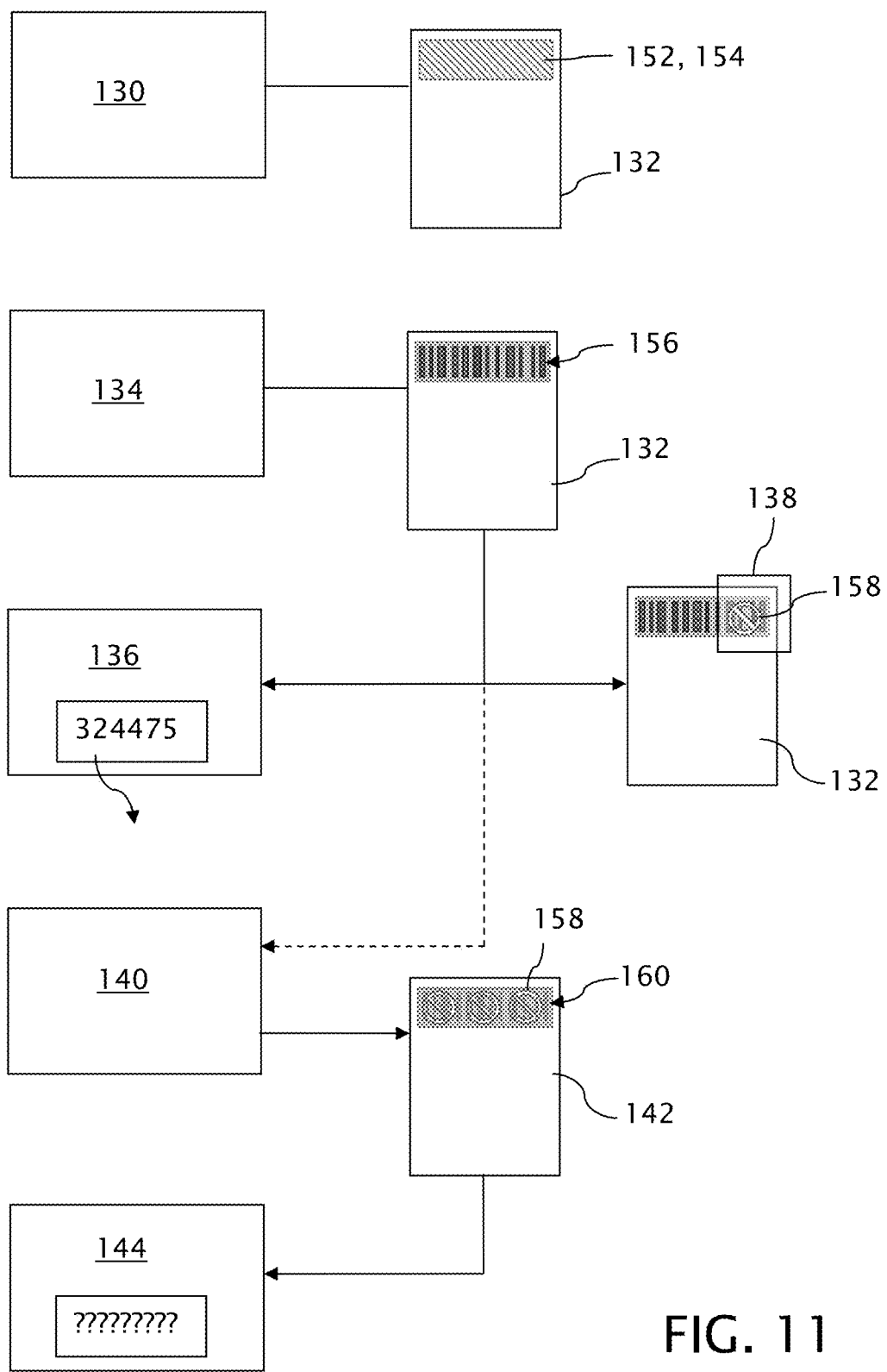
FIG. 11 is a diagram of a copy protection system in accordance with the disclosure illustrating the printing and reading of an original document with a barcode pattern along with the intended disabling effect on the reading of the barcode on a copy of the original document.

An example of a barcode copy protection system as envisioned for carrying out an embodiment of the present disclosure is depicted in FIG. 11. A printer 130, which can take a variety of forms from a repeating inline press to a digital laser or ink jet printer, prints a security pattern and background 152, 154 (as described above) onto an original document 132 (or a succession of original documents). The same or a different printer 134 prints a barcode pattern 156 (also as described above) over the printed security pattern and background 152, 154 on the original document 132. A conventional barcode scanner 136 successfully reads the barcode pattern 156 printed on the original document 132. In addition, a decoding viewer 138 verifies the authenticity of the original document 132 by revealing one or more hidden images 158 formed by the security pattern 152. A conventional copier 140 operating according to manufacturer recommended settings makes an unauthorized copy of the original document 132 onto a substitute document 142. As a result of interference produced by the security pattern 152, the same or a different conventional barcode scanner 144 fails to successfully read a reimaged barcode pattern 160 on the substitute document 142. The hidden images 158 are reproduced in a visible form on the substitute document 142 by the conventional copier 140 as a visible indication that the substitute document 142 represents an unauthorized copy.

Although the print elements (e.g., line segments) of the security patterns in the preceding embodiments are shown oriented horizontally so as to be perpendicular to the barcode elements, the print elements of the security patterns can also be printed through a range of acute angles (e.g., generally 45 degrees or more) to the barcode elements so long as the print elements do not create ambiguity as to the location of the edges of the barcode elements for purposes of reading the barcode patterns on original documents. The barcode elements themselves can take other forms susceptible to interpretation by scanning.

The barcode pattern, the security pattern and the background can be printed in a variety of colors other than black. The Pantone® Matching System of Pantone LLC of Carlstadt, N.J., can be used to select colors that match print densities similar in effect to black ink.

The security patterns alone can be printed in conjunction with the barcode elements to successfully undermine interpretation of barcode patterns by conventional barcode scanning technology. The security pattern can be located along the height of a single barcode element or more preferably the security pattern can be distributed along different heights of multiple barcode elements so that at least one barcode element is interrupted by the security pattern regardless of the linear scan direction through which the barcode pattern is scanned (i.e., through a full range of linear scanning directions).

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A copy protection system comprising:
   a barcode pattern including a plurality of barcode elements printed on a printable surface at a print density less than 90 percent;
   a security pattern printed on the printable surface at a print density between 10 percent and 30 percent;
   a background pattern printed on the printable surface wherein the background pattern is a repeated geometric design such that when the printable surface is imaged the background pattern and the security pattern distort at least one of the plurality of barcode elements; and
   wherein the security and background patterns are positioned to intersect an edge of at least one of the plurality of barcode elements.

2. The system of claim 1, in which the barcode elements are printed at a print density between 55 percent and 85 percent.

3. The system of claim 2, in which the barcode elements overlap the security pattern.

4. The system of claim 1, in which the security pattern is formed by print elements of a line screen oriented to intersect edges of the barcode elements at an angle of at least 45 degrees.

5. The system of claim 1, wherein the background pattern has a print density matching a print density of the security pattern, and the security pattern is printed within correspondingly shaped voids in the background pattern.

6. The system of claim 5, in which the security pattern is formed by print elements of a line screen having a line frequency between 55 and 95 lines per inch and the background pattern is formed by print elements of a line screen having a line frequency of at least 150 lines per inch.

7. A method comprising:
   printing, on a printable surface, a barcode pattern including a plurality of barcode elements at a print density less than 90 percent;
   printing a security pattern on the printable surface at a print density between 10 percent and 30 percent,
   printing a background pattern on the printable surface wherein the background pattern is a repeated geometric design such that when the printable surface is imaged the background pattern and the security pattern distort at least one of the plurality of barcode elements; and
   wherein the security and background patterns are positioned to intersect an edge of at least one of the plurality of barcode elements.

8. The method of claim 7, in which the printing the barcode pattern includes printing the barcode elements at a print density between 55 percent and 85 percent.

9. The method of claim 7, in which the printing the security pattern includes printing print elements of a line screen oriented to intersect edges of the barcode elements at an angle of at least 45 degrees.

10. The method of claim 7, wherein the printing the security pattern includes printing the security pattern within voids in the background pattern.

11. The method of claim 10, in which the printing the security pattern includes printing print elements of a line screen having a line frequency between 55 and 95 lines per inch, and the printing the background pattern includes printing print elements of a line screen having a line frequency of at least 150 lines per inch.

\* \* \* \* \*